United States Patent
Li et al.

(10) Patent No.: US 12,046,399 B2
(45) Date of Patent: Jul. 23, 2024

(54) REDUCTION OF CRACKS IN ADDITIVELY MANUFACTURED Nd—Fe—B MAGNET

(71) Applicant: FORD GLOBAL TECHNOLOGIES, LLC, Dearborn, MI (US)

(72) Inventors: Wanfeng Li, Novi, MI (US); Chuanbing Rong, Canton, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/585,934

(22) Filed: Jan. 27, 2022

(65) Prior Publication Data

US 2023/0290546 A1    Sep. 14, 2023

(51) Int. Cl.

| | |
|---|---|
| *H01F 1/055* | (2006.01) |
| *B33Y 70/00* | (2020.01) |
| *C22C 38/00* | (2006.01) |
| *C22C 38/06* | (2006.01) |
| *C22C 38/10* | (2006.01) |
| *C22C 38/12* | (2006.01) |
| *H01F 1/057* | (2006.01) |
| *H01F 41/02* | (2006.01) |
| *B22F 10/28* | (2021.01) |
| *B33Y 10/00* | (2015.01) |

(52) U.S. Cl.
CPC ............. *H01F 1/057* (2013.01); *B33Y 70/00* (2014.12); *C22C 38/005* (2013.01); *C22C 38/06* (2013.01); *C22C 38/105* (2013.01); *C22C 38/12* (2013.01); *H01F 41/0253* (2013.01); *B22F 10/28* (2021.01); *B22F 2301/355* (2013.01); *B33Y 10/00* (2014.12); *C22C 2202/02* (2013.01)

(58) Field of Classification Search
None
See application file for complete search history.

(56) References Cited

U.S. PATENT DOCUMENTS

| | | | |
|---|---|---|---|
| 10,290,407 B2 | 5/2019 | Liang et al. | |
| 10,614,952 B2 | 4/2020 | Nagata et al. | |
| 2002/0117022 A1* | 8/2002 | Uchikoshi | C23C 14/3414 420/8 |
| 2002/0127132 A1* | 9/2002 | Deevi | H01F 1/14716 148/311 |

(Continued)

FOREIGN PATENT DOCUMENTS

| | | |
|---|---|---|
| CN | 100501883 C | 6/2009 |
| EP | 1523017 B1 | 8/2008 |

(Continued)

OTHER PUBLICATIONS

Kimura (Materials Transactions, JIM, vol. 35, No. 3 (1994), p. 182-188). (Year: 1994).*

*Primary Examiner* — Xiaowei Su
(74) *Attorney, Agent, or Firm* — David B Kelley; Brooks Kushman P.C.

(57) ABSTRACT

A permanent magnet formed by additively manufacturing magnetic phases and buffer phases is disclosed. The buffer phase(s) may improve performance, enhance mechanical properties and allow the magnet to better tolerate stresses such that defects such as cracking do not occur or are less likely to occur. The buffer phase may be a magnetic or non-magnetic material.

14 Claims, 2 Drawing Sheets

(56) References Cited

U.S. PATENT DOCUMENTS

| | | | | |
|---|---|---|---|---|
| 2008/0223489 A1* | 9/2008 | Nagata | ................ | C22C 33/0278 |
| | | | | 148/303 |
| 2013/0153088 A1* | 6/2013 | Dreikorn | ............ | H01F 41/0293 |
| | | | | 427/127 |
| 2014/0132376 A1* | 5/2014 | Jin | .......................... | C22C 38/10 |
| | | | | 75/346 |

FOREIGN PATENT DOCUMENTS

| | | | |
|---|---|---|---|
| JP | 0249973 A1 * | 6/1987 | |
| JP | 6791902 B2 | 11/2020 | |

* cited by examiner

REDUCTION OF CRACKS IN ADDITIVELY MANUFACTURED Nd—Fe—B MAGNET

TECHNICAL FIELD

The present disclosure relates to permanent magnets and methods of making the same via additive manufacturing techniques.

BACKGROUND

Magnets pervade many technologies of modern life. Permanent magnets such as rare earth magnets (e.g., Nd—Fe—B) are widely used in electric machines and may be used in modern vehicles including electric vehicles and hybrid electric vehicles. For example, electric machines may include motors such as traction motors.

SUMMARY

A permanent magnet is disclosed. The permanent magnet may include a magnetic phase and a buffer segment. The buffer segment may include a composition represented by the formula:

    (I).

N may be nickel, aluminum or a combination thereof, M may be iron, cobalt or a combination thereof and Q may be chromium, titanium, molybdenum, copper, niobium or a combination thereof. In one variation, nickel may be present at greater than 25% by weight. In a refinement, N may be a combination of nickel and aluminum having an atomic ratio of 1:2 to 5:6, or more preferably 2:3 to 4:5, or even more preferably about 3:4. The atomic ratio of x:y may be from 0.3:1 to 1:2. Alternatively or additionally, the buffer segment may include a composition represented by the formula:

    (IV)

Iron may be greater than 5% by weight, and the atomic ratio of a:b may be from 0.3:1 and 1:3.

A method of making a magnet is also disclosed. The method may include additively manufacturing a first and second layer disposed upon one another. The first and second layer may be formed from first and second powder mixtures. The first powder mixture may include a magnetic alloy and/or a buffer alloy. The second mixture may include the other of the magnetic alloy or the buffer alloy. The buffer alloy may form a buffer layer or segment having a composition represented by the formula:

    (I).

N may be nickel, aluminum or a combination thereof, M may be iron, cobalt or a combination thereof and Q may be chromium, titanium, molybdenum, copper, niobium or a combination thereof. In one variation, nickel may be present at greater than 25% by weight. In a refinement, N may be a combination of nickel and aluminum having an atomic ratio of 1:2 to 5:6, or more preferably 2:3 to 4:5, or even more preferably about 3:4. The atomic ratio of x:y may be from 0.3:1 to 1:2. Alternatively or additionally, the buffer layer or segment may include a composition represented by the formula:

    (IV)

Iron may be greater than 5% by weight, and the atomic ratio of a:b may be from 0.3:1 and 1:3.

A magnetic having a plurality of stratified magnetic segments and a plurality of stratified buffer segments is disclosed. The buffer segments may include a composition represented by the formula:

    (I).

N may be nickel, aluminum or a combination thereof, M may be iron, cobalt or a combination thereof and Q may be chromium, titanium, molybdenum, copper, niobium or a combination thereof. In a variation, nickel may be present at greater than 25% by weight. In a refinement, N may be a combination of nickel and aluminum having an atomic ratio of 1:2 to 5:6, or more preferably 2:3 to 4:5, or even more preferably about 3:4. The atomic ratio of x:y may be from 0.3:1 to 1:2. Alternatively or additionally, the buffer layer or segment may include a composition represented by the formula:

    (IV)

Iron may be greater than 5% by weight, and the atomic ratio of a:b may be from 0.3:1 and 1:3.

DETAILED DESCRIPTION

Figure 1A:
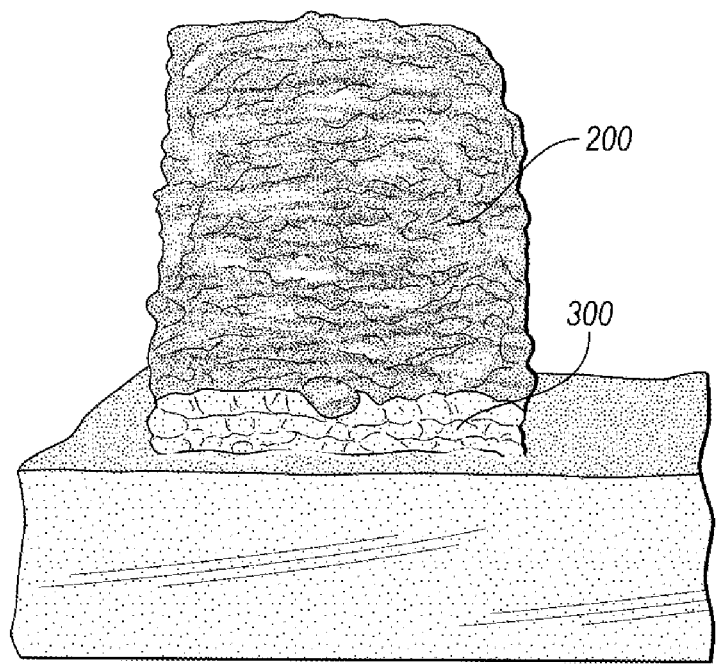
FIG. 1A is a perspective view of a permanent magnet.

Embodiments of the present disclosure are described herein. It is to be understood, however, that the disclosed embodiments are merely examples and other embodiments can take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Unless expressly stated to the contrary, percent, "parts of," and ratio values are by weight. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

This disclosure is not limited to the specific embodiments and methods described below, as specific components and/or conditions may vary. Furthermore, the terminology used herein is used only for the purpose of describing particular embodiments and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" or "generally" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

As shown in FIG. 1A, an additively manufactured permanent magnet 100 having one or more magnetic segments 200 and one or more buffer segments 300 is disclosed. The one or more magnetic segments 200 may be one or more magnetic layers and the one or more buffer segments 300 may be one or more buffer layers. Alternatively, or in addition, discrete buffer segments may be dispersed within the magnetic phase. The buffer segments 300 may improve performance of the magnetic phase, enhance mechanical properties and help alleviate stresses throughout the brittle magnetic phase such that cracking does not occur. The magnetic segments 200 and/or buffer segments 300 may be comprised of stratified layers via additive manufacturing such as laser melting alloy powders. Additive manufacturing allows for the combination of intricately designed discrete phases that provide unique properties or synergies not otherwise available.

The magnetic phase or segments 200 may be any alloy having magnetic properties. In some variations, a rare earth magnet or alloy such as Nd—Fe—B may be used. The buffer segments 300 may be metals, alloys and compounds that enhance performance, provide superior performance, or alleviate undesirable properties.

In one variation, a buffer segment and/or layer may include an alloy such as with iron (Fe), cobalt (Co), nickel (Ni) or a combination thereof. The alloy may also include chromium (Cr), titanium (Ti), aluminum (Al), molybdenum (Mo), copper (Cu), niobium (Nb) or a combination thereof. For example, the buffer segment 200 may include a composition represented by the following formula:

$$N_xM_yQ_z \quad (I).$$

In one or more embodiments, N is nickel, aluminum or a combination thereof, M is iron, cobalt, or a combination thereof, and Q is chromium, titanium, molybdenum, or a combination thereof. In a refinement, Q may also include copper, niobium, or combinations thereof. In another refinement, the atomic ratio of x:y is from 0.3:1 to 1:3, or more preferably from 0.5:1 to 1:2, or even more preferably from 0.8:1.2. For example, the atomic ratio of x:y may be 1:1. In yet another refinement, nickel may be present at greater than 15% by weight, or more preferably greater than 20% by weight or even more preferably greater than 25% by weight of the composition. In a refinement, N may be a combination of nickel and aluminum having an atomic ratio of 1:2 to 5:6, or more preferably 2:3 to 4:5, or even more preferably about 3:4.

In another variation, a buffer segment and/or layer may include a composition represented the following formula:

$$Ni_xFe_yQ_z \quad (II).$$

In one or more embodiments, Q is copper, cobalt, aluminum, titanium, niobium, or a combination thereof. In a refinement, nickel may be present at greater than 30% by weight, or more preferably greater than 35% by weight, or even more preferably greater than 40% by weight of the composition. In still another refinement, iron (Fe) may be present at 10 to 40% by weight, or more preferably 15 to 35% by weight, or even more preferably 20 to 30% by weight of the composition.

In yet another variation, a buffer layer and/or segment may include a composition represented by the formula:

$$Cr_xCo_yFe_z \quad (III).$$

In a refinement, chromium may be present at 10-45% by weight, or more preferably 15-40%, or even more preferably 20-35% by weight of the composition. In yet another refinement, cobalt may be present 1-35% by weight, or more preferably 3-30%, or even more preferably 5-25% by weight of the composition. In yet another refinement, iron makes up the remaining portion.

In still another variation, a buffer layer and/or composition may include a composition represented by the following formula:

$$Fe_xCo_yV_z \quad (IV).$$

In a refinement, vanadium is present at greater than 5% by weight, or more preferably greater than 10%, or even more preferably greater 15% by weight of the composition with the remaining portion being the combination of iron and cobalt. In still another refinement, the atomic ratio of x:y (i.e., iron:cobalt) is from 0.3:1 to 1:3, or more preferably from 0.5:1 to 1:2, or even more preferably from 0.8:1.2. For example, the atomic ratio of x:y may be 1:1.

Figure 1B:
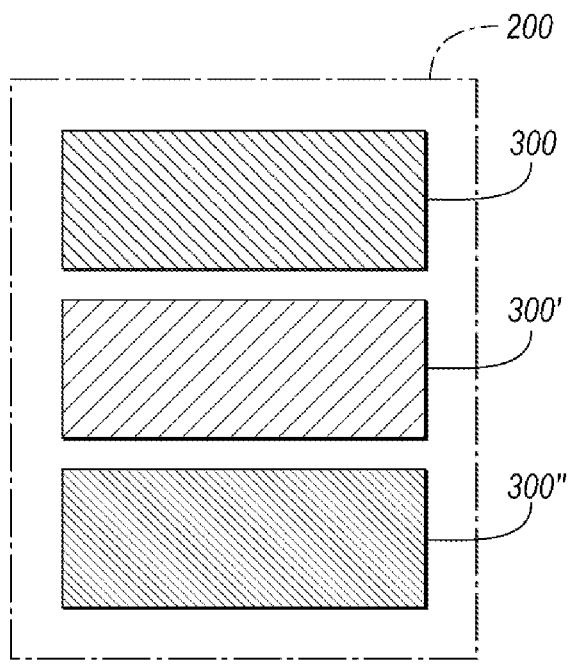
FIG. 1B is a cross-section schematic view of a permanent magnet.
Figure 3:
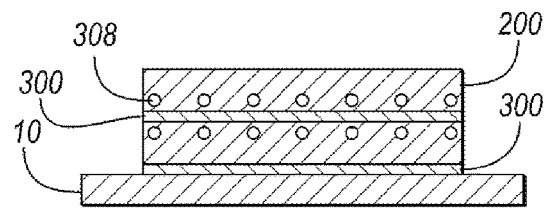
FIG. 3 is a schematic view of another permanent magnet.
Figure 4:
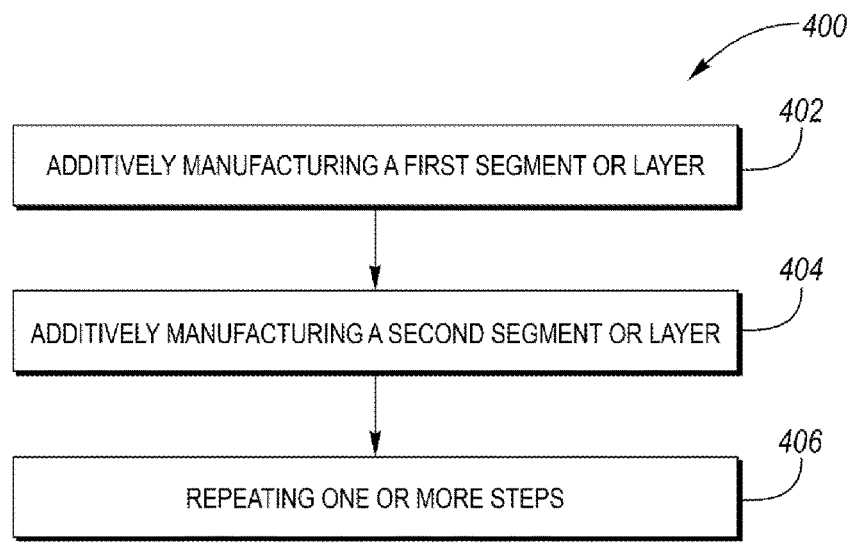
FIG. 4 is a flowchart of a method of making a permanent magnet.

In still another embodiment, the one or more buffer segments 300 may be disposed within the magnetic phase 200 or within a magnetic layer itself as discrete portions such as buffer particles 308, as shown in FIG. 3. In some embodiments, the magnet 100 may include a plurality of magnetic layers or segments 200 and a plurality of buffer layers or segments 300. The buffer layers or segments 300 may have the same or different compositions. For example, as shown in FIG. 1B, a cross-section view reveals one or more buffer segments 300, 300', 300" may be the same or different. The buffer layers or segments 300, 300', 300" may also be a mixture of a magnetic alloy and non-magnetic alloy. In one or more embodiments, the buffer layers or segments 300, 300', 300" may be mixtures of a magnetic alloy and non-magnetic alloy at different ratios. For example, the buffer layers or segments may include a non-magnetic alloy at 1 to 100%, or more preferably 10 to 99%, or even more preferably at 50 to 95% by of the layer with the remaining portion being a magnetic alloy. In another example, segment 300 may be a mixture of a magnetic alloy to a non-magnetic alloy at a ratio of 1:2, segment 300' may be a mixture at a ratio of 1:3, and segment 300" may be a mixture at a ratio of 1:4 by weight of the buffer segment or layer 300.

Figure 2A:
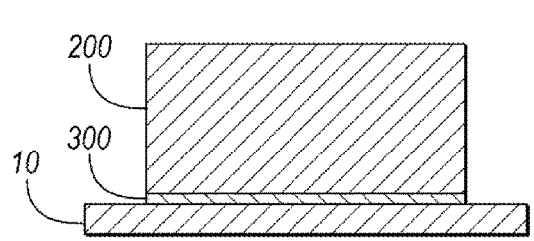
FIG. 2A-2B are schematic views of permanent magnets.
Figure 2B:
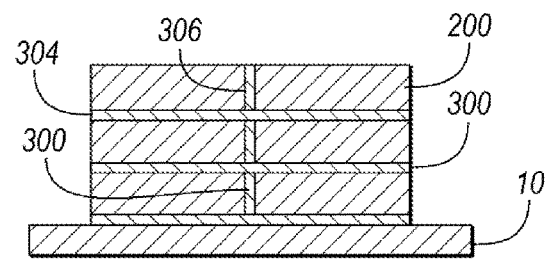

The combination of magnetic segments and buffer segments is not particularly limited but may include alternating layers, or hatch patterns. If alternating layers are used, they may be substantially horizontal, vertical and/or diagonal. For example, as shown in FIG. 2A, a horizontal magnetic phase is disposed on a horizontal buffer layer 302 which is disposed on a substrate 10. In FIG. 2B, buffer layers 304 are disposed horizontally and buffer layer 306 is disposed vertically throughout the magnetic phase 200.

A method of making a magnet is also disclosed. The method 400 includes additively manufacturing a first segment or layer (i.e., step 402), and a second segment or layer (i.e., step 404) first powder mixture including a magnetic alloy or a second powder mixture including a first buffer alloy. In a variation, the second layer may be disposed on the first layer. The first layer may be made from, for example, laser melting a first powder mixture and the second layer may be made from, for example, laser melting a second powder mixture. The first powder mixture may include a magnetic alloy or a buffer alloy. The second powder mixture may include the other of the magnetic alloy or the buffer alloy. This process may be repeated to additional magnetic or buffer layers or segments (i.e., step 406). If more than one buffer layers or segments are included, they may be made from the same or different buffer alloys. The buffer alloy may form one or more of the buffer layers as disclosed herein.

A layer or segment may include both a discrete magnetic phase and a discrete buffer phase such as by mixing the magnetic alloy powder and buffer alloy powder, as shown in FIG. 2C. In a refinement, the buffer alloy powder may be less than the magnetic alloy powder by weight or volume. In one variation, the buffer alloy may be less than 40%, or more preferably less than 25%, or even more preferably less than 5% of the mixture. For example, a first buffer layer may be formed by laser melting a first buffer alloy powder, then a magnetic layer may be disposed on the first buffer layer by laser melting a magnetic powder, then a second buffer alloy may be formed by laser melting a second buffer alloy powder. The first and second buffer layers may each be less than 30%, or more preferably less than 15%, or even more preferably less than 5%. In other words, in one or more embodiments, the first and second buffer layers may be less than a magnetic phase such as Nd—Fe—B. It should be understood that any segment or layer may itself be comprised of stratified layers as it may be additively manufactured such as from laser melting. Laser melting may include but is not limited to selective laser melting (SLM), direct metal laser melting (DMLM), and/or powder bed fusion. For example, a layer of powder may be provided at a predetermined thickness and a laser may then melt or sinter the powder to form a specific shape. An additional powder layer may be applied on top of the specific shape. This new powder layer can then be melted or sintered to the specific shape to build an additional layer of the specific shape. This process may be repeated until the desired shape is achieved. In other words, the magnet is formed layer by layer. The magnet may be heat treated (e.g., annealed) after any step or once fully printed. For example, the magnet may be heat treated at a temperature of 600 to 1100° C., or more preferably 650 to 1050° C., or even more preferably 600 to 1000° C. The magnet may also be formed under (i.e., exposed to) a magnetic field such as during heat treatment(s). This may improve anisotropy.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A permanent magnet comprising:
a magnetic phase; and
a buffer segment including a composition represented by the formula:

$$N_xM_yQ_z \quad (I)$$

wherein an atomic ratio of x:y is 0.3:1 to 1:1, N is Ni and Al where Ni:Al is at an atomic ratio from 1:2 to 5:6, M is Fe, Co, or a combination thereof, Q is Cr, Ti, Mo, Cu, Nb or combinations thereof and present, and a sum of x, y, and z is 100%.

2. The permanent magnet of claim 1, wherein the magnetic phase includes Nd—Fe—B.

3. The permanent magnet of claim 1, wherein Q is Cr, Ti, Mo, or combinations thereof.

4. The permanent magnet of claim 1, wherein Fe is present at 10 to 40% by weight of the buffer segment.

5. The permanent magnet of claim 4, wherein the buffer segment includes Cu, Co, Ti, Nb or a combination thereof.

6. A permanent magnet comprising:
a magnetic phase; and
a buffer segment including an alloy composition represented by the formula:

$$N_xM_yQ_z \quad (I)$$

wherein an atomic ratio of x:y is from 0.3:1 to 1:1 and the sum of x, y, and z is 100%, N is Ni, Al, or combinations thereof, M is Fe, Co, or combinations thereof, Q is Cr, Ti, Mo, Cu, Nb, or combinations thereof, and the buffer segment includes 10-45% by weight of Cr and 1-35% by weight of Co.

7. The permanent magnet of claim 6, wherein the buffer segment includes 3-30% by weight of Co.

8. The permanent magnet of claim 7, wherein a remaining portion of the buffer segment is Fe.

9. The permanent magnet of claim 6, wherein the buffer segment includes 15-40% by weight of Cr.

10. The permanent magnet of claim 6, wherein the buffer segment includes 20-35% by weight of Cr.

11. The permanent magnet of claim 6, wherein the buffer segment includes 5-25% by weight of Co.

12. The permanent magnet of claim 6, wherein the buffer segment includes 20-35% by weight of Cr and 5-25% by weight of Co.

13. The permanent magnet of claim 12, wherein the buffer segment includes at least 35% by weight of Fe.

14. The permanent magnet of claim 12, wherein a remaining portion of the buffer segment is Fe.

\* \* \* \* \*